United States Patent [19]

Arendt

[11] 4,293,535

[45] * Oct. 6, 1981

[54] MOLTEN SALT SYNTHESIS OF ALKALINE ZIRCONATE POWDER

[75] Inventor: Ronald H. Arendt, Schenectady, N.Y.

[73] Assignee: General Electric Company, Schenectady, N.Y.

[*] Notice: The portion of the term of this patent subsequent to Nov. 11, 1997, has been disclaimed.

[21] Appl. No.: 180,343

[22] Filed: Aug. 22, 1980

[51] Int. Cl.$^3$ .............................................. C01G 25/00
[52] U.S. Cl. ............................ 423/593; 423/DIG. 12
[58] Field of Search ..................... 423/593, DIG. 12; 252/62.9; 106/57

[56] References Cited

U.S. PATENT DOCUMENTS

| | | | |
|---|---|---|---|
| 3,509,057 | 4/1970 | Greger | 423/594 |
| 3,793,443 | 2/1974 | Arendt | 423/594 |
| 4,152,280 | 5/1979 | Arendt et al. | 423/DIG. 12 |
| 4,152,281 | 5/1979 | Arendt et al. | 423/DIG. 12 |
| 4,201,760 | 5/1980 | Arendt et al. | 423/DIG. 12 |

OTHER PUBLICATIONS

Bailey et al., "The Chemistry of Non-Aqueous Solvents," Academic Press, N.Y., 1966, pp. 291–297, vol. 1.
Beck et al., "APC Published Application, Ser. No. 393,258 and Ser. No. 292,742," Jul. 13, 1943.

*Primary Examiner*—Herbert T. Carter
*Attorney, Agent, or Firm*—Jane M. Binkowski; James C. Davis, Jr.; Leo I. MaLossi

[57] ABSTRACT

A particulate mixture of an alkali chloride solvent salt, zirconium oxide and an alkaline earth reactant selected from the group consisting of barium oxide, strontium oxide, and mixtures thereof, is heated to melt the chloride salt solvent in which the zirconium oxide and alkaline earth reactant dissolve and react precipitating a zirconate selected from the group consisting of barium zirconate, strontium zirconate and mixtures thereof.

7 Claims, No Drawings

MOLTEN SALT SYNTHESIS OF ALKALINE ZIRCONATE POWDER

The present invention relates to the preparation of small crystallite size barium and/or strontium zirconate powder.

Conventionally, barium or strontium zirconate powder is prepared by the high temperature solid state reaction of appropriate precursor compounds. The reaction product is in the form of relatively large, strong self-bonded particle aggregates which must be comminuted to the desired approximately 1.0 micron particle size before fabrication into ceramic articles.

One of the inadequacies of this conventional procedure is that the product, in commercial practice, is not fully reacted to yield uniform stoichiometry on a microscopic level. In cases where the physicochemical properties depend on the composition and its uniformity, the nonuniform composition of the conventional product can lead to less than optimum properties. Although procedures can be adopted in the conventional process to minimize these variations, the penalty in additional effort can be considerable.

The comminution portion of the conventional process is also potentially detrimental in that significant, uncontrollable quantities of undesirable impurities can be introduced from the grinding media. Again, extraordinary precautions can be taken to minimize the comminution effects, but with attendant penalties.

The present invention circumvents the inadequacies of the conventional process by substituting for the solid state reaction, a liquid phase reaction scheme utilizing a molten salt solvent with subsequent precipitation of the product which does not require comminution. In the present process, the reactants are slightly soluble in the molten salt solvent, therefore allowing literally atomic mixing in the liquid phase of the reactants. The solubilities of the reactants are such that they exceed the corresponding solubilities determined by the solubility product of the product in the molten salt solvent. Hence, the reaction product precipitates spontaneously from the molten salt solution. The reactants will continually dissolve to maintain a reactant-saturated solution until they are totally consumed by product formation.

Preferably, the reaction temperature in the present process is that required to attain reasonable rates in the molten salt solvent, but it can be significantly lower than in the corresponding conventional solid state synthesis. Similarly, the reaction time can be as short as about 30 minutes or shorter compared with several hours for solid state reaction.

Briefly stated, the present process for producing alkaline earth zirconate powder consists essentially of providing particulate zirconium oxide in at least stoichiometric amount or particulate precursor therefor, providing particulate alkaline earth oxide in at least stoichiometric amount selected from the group consisting of barium oxide, strontium oxide, and mixtures thereof or particulate precursor therefor, providing an alkali chloride salt selected from the group consisting of sodium chloride, potassium chloride and mixtures thereof, forming a mixture of said zirconium oxide or precursor therefor, said alkaline earth oxide or precursor therefor and said chloride salt solvent, heating said mixture to a reaction temperature at least sufficient to melt said chloride salt but lower than the temperature at which said alkaline earth titanate melts, said chloride salt in molten form being a solvent for said zirconium oxide and said alkaline earth oxide, each said precursor decomposing completely at or below said reaction temperature to form said oxide and by-product gas, maintaining said reaction temperature dissolving and reacting said zirconium oxide and said alkaline earth oxide in said molten salt and precipitating the alkaline earth zirconate and recovering said precipitated alkaline earth zirconate.

The reactions for producing the present alkaline earth zirconates are as follows:

$$BaO + ZrO_2 \xrightarrow[\text{above its liquidus}]{\text{chloride solvent}} BaZrO_3$$

$$SrO + ZrO_2 \xrightarrow[\text{above its liquidus}]{\text{chloride solvent}} SrZrO_3$$

All of the reactants are used in at least stoichiometric amounts to achieve complete reaction. Amounts of BaO and/or SrO in excess of stoichiometric results in the introduction of a secondary phase in the product, i.e. $Ba_3Zr_2O_7$ and $Sr_3Zr_2O_7$. Generally, the amount of this secondary phase increases with increasing excess amounts of the oxides of barium and strontium. A mixture of BaO and SrO produces a solid solution zirconate of the Ba and Sr components.

The present process produces alkaline earth zirconate. Since the crystals of alkaline earth zirconate are produced by precipitation from a saturated solution, they are chemically homogeneous, i.e. they are of uniform composition on a microscopic level. Also, since the individual crystals range up to about 1 micron in size and are generally submicron, they do not require any crushing or grinding operations with their attendant contamination with impurities from the equipment employed before they can be fabricated into useful ceramic articles. Also, the crystals are roughly spherical, i.e. they lack sharp edges and corners, appearing as truncated cubes.

In carrying out the present process, the reactants or precursors therefor can be of commercial or technical grade, and their particular purity depends largely on the particular application of the resulting alkaline earth zirconate. Specifically, the reactant oxides should not contain any impurities which would have a significantly deleterious effect on the resulting alkaline earth zirconate powder or on its particular application.

The reactant oxides or precursors therefor should be of a size which allows the reaction to take place. Generally, these reactants or precursors therefor are used and are satisfactory in the particle size range in which they are available commercially, which ordinarily ranges from submicron up to about 100 microns. The reactant powders should also be free of large, hard aggregates, i.e. significantly above 100 microns in size, which might survive th mixing process and prevent sufficient reactant contact for satisfactory reaction rates.

In the present process the chloride salt is selected from the group consisting of sodium chloride, potassium chloride and mixtures thereof. The chloride salt solvent is used in a minimum amount of at least about 20% by weight of the total amount of reactant oxides and chloride salt solvent, and typically about 50% by weight. Amounts of chloride salt lower than about 20% by weight are not practical since the desired reaction will not proceed. There is no upper critical maximum amount of chloride salt, but amounts of chloride salt higher than about 80% by weight of the total amount of reactant oxides and chloride salt solvent provide no significant advantage. As the amount of chloride salt or salt mixture is increased from 20% by weight to about 50% by weight, the amount of individual grains or crystals present in the resulting alkaline earth zirconate powder increases correspondingly, and with an amount of chloride salt or salt mixture above about 50% by weight, substantially all or all of the product powder recovered consists essentially of individual grains or crystallites.

The reactants or precursors therefor and the alkali chloride salt solvent are admixed to produce a substantially thorough mixture to insure good contact and complete reaction. The actual mixing operation can be carried out in several ways which do not introduce undesirable impurities into the resulting product. Preferably, water at room or ambient tmperature is admixed with the reactant oxides or precursors therefor and the chloride salt solvent in an amount which, with stirring, is at least sufficient to form a slurry. The wet mixing can be carried out, for example, using a plastic milling medium or by wet mixing in a high speed blender with preferably distilled or deionized water, depending on the application of the resulting product and preferably, with stainless steel or plastic stirrers, for example a propeller, in a stainless steel or plastic, preferably Teflon, lined vessel.

The particular reaction temperature used depends largely on the chloride salt used and the reaction rate desired, i.e. rate of precipitation of alkaline earth zirconate desired. Generally, the higher the reaction temperature, the faster is the reaction rate. In molten form, the present chloride salt is a solvent for the reactant oxides, and the minimum reaction temperature is the temperature at which the chloride salt or salt mixture melts and for sodium chloride alone the melting point or liquidus temperature is about 1073K (800° C.) whereas for potassium chloride alone it is about 1063K (790° C.) All mixtures of sodium chloride and potassium chloride form a mixture which melts at a temperature below the melting point of sodium chloride alone and thus, for the eutectic mixture of 50 mole % potassium chloride −50 mole % sodium chloride the minimum reaction temperature is 931K (658° C.). Preferably, in the present invention, the minimum reaction temperature is at least about 10K above the melting point, i.e. liquidus temperature of the chloride salt or salt mixture since such a temperature insures complete melting of chloride salt and also increases the fluidity of the molten salt producing increased wetting of the reaction mixture. However, the maximum reaction temperature is always below the melting point of the alkaline earth zirconate being precipitated, which for $SrZrO_3$ and $BaZrO_3$ is >2000K, and should be kept below the temperature at which the chloride salt vaporizes significantly. Particularly preferred is a reaction temperature ranging from about 1073K (800° C.) to about 1373K (1100° C.) since it is not difficult to maintain and provides high reaction rates without significant vaporization of the molten salt solvent.

At reaction temperature the chloride salt melts and the reactant oxides dissolve and react in the molten salt precipitating the alkaline earth zirconate. The reaction temperature is maintained until the reaction is completed. The particular period of reaction time depends largely on reaction temperature as well as the amount of chloride salt used and is determinable empirically. When the reaction is completed, the reacted mass is cooled at any convenient rate, preferably in air and preferably to about room temperature.

The cooled alkaline earth zirconate-containing reacted mass is a solid, fired cake comprised of alkaline earth zirconate particles distributed throughout a matrix of solidified chloride salt. Specifically, the alkaline earth zirconate, which is maintained as distinct second phase crystallites, is present as fine crystallites embedded in the molten salt matrix. After reaction at elevated temperature, the cooled, solidified cake is disintegrated with water to yield the alkaline earth zirconate crystallites and an aqueous solution of the chloride salt. More specifically, water, preferably distilled or deionized to prevent introduction of impurities and preferably at room temperature, is added to the solid reacted mass in an amount at least sufficient to dissolve away the chloride salt content therefrom. The solubility of the present chloride salt is about 0.3 kilogram per liter of water at room temperature. This dissolution preferably is carried out in a plastic vessel, and as a practical matter with mixing to substantially shorten dissolution time, using, for example, a motor driven plastic or stainless steel stirrer. As the chloride salt dissolves, the solid mass disintegrates leaving a fine alkaline earth zirconate powder that contains no perceptibly agglomerated material, i.e. perceptible to the eye. The alkaline earth zirconate powder is then collected, washed and dried.

The alkaline earth zirconate powder can be recovered from the aqueous supernatant chloride solution by a number of techniques. For example, the alkaline earth zirconate powder can be recovered by decanting the supernatant solution and drying the alkaline earth zirconate in air. The particular recovery technique depends on the impurities which may be present and on the purity required in the ceramic or other product fabricated from the powder. Preferably, the resulting slurry is mixed at room temperature in air for about 20 minutes. Mixing is then discontinued and a flocculating agent which is organic and soluble in water, preferably an anionic flocculant, is added in an amount which is sufficient to flocculate and settle the alkaline earth zirconate powder. After several washings and settlings, the wet powder is dried. Preferably, the flocculating agent is added in aqueous solution, about 0.1 gram of flocculant per 100 grams of water usually being satisfactory, and preferably the flocculating agent is used only in an amount necessary to settle the powder. For production of an alkali earth zirconate powder of high purity, the flocculating agent should be completely removable by heating the power in air at temperatures below the melting point of the powder and preferably not higher than about 1073K (800° C.). Preferably, to remove any remaining water and flocculant, it is heated at about 773K (500° C.) for about 20 minutes.

Alternatively, in the present process, if desired, a particulate inorganic precursor of the reactant oxides can be used. The precursor should decompose completely to form the oxide and by-product gas or gases leaving no contaminants in the reacted mass. Representatives of the precursors of the reactant oxides useful in the present process are the carbonates, hydroxides and nitrates. The precursor should be used in an amount sufficient to produce the respective oxide in at least stoichiometric amount.

The present alkaline earth zirconate powders are light yellow in color. The alkaline earth zirconate powders are free-flowing and can be in the form of aggregates or in the form of individual powder crystals, but usually it is a mixture of both. The aggregates which range in size from about 1 micron to about 20 microns, are particles consisting essentially of a cluster of smaller sized crystals weakly bonded together autogeneously, i.e. such bonding is believed to be caused by Van der Waal's forces or by self-bonding, i.e. neck growth between grains. The individual grains range up to about 1 micron in size and usually are submicron. The aggregates are friable and are readily broken down with very gentle comminution during subsequent pressing into a green body.

The present alkaline earth zirconate powder is selected from the group consisting of barium zirconate, strontium zirconate and a solid solution zirconate of barium and strontium. The present zirconate powder can be prepared free of impurities or free of significant impurities. Therefore, when the same procedure is used, its properties are reproducible from batch to batch.

The present alkaline earth zirconate powder can be pressed into green bodies of desired size and shape and fired at temperatures below its melting point in an oxygen-containing atmosphere such as air to produce fired polycrystalline bodies with densities of at least about 85% of theoretical density. Alternatively, the powder could be hot-pressed in an oxide die, preferably an alumina die press at temperatures of about 1573K to 1673K under a pressure of at least about 6000 psi to produce a hot pressed product having a density higher than 95% of theoretical density. These sintered or hot pressed products are useful, for example, as dielectric materials for capacitors and electrical circuits.

The invention is further illustrated by the following examples:

EXAMPLE 1

17.93 grams of reagent grade $BaCO_3$ (0.5% by weight in excess of $BaZrO_3$ stoichiometry) ranging in size up to about 100 microns, 11.14 grams of reagent grade $ZrO_2$ ranging in size up to about 100 microns, 10.98 grams of NaCl and 14.02 grams of KCl were stirred vigorously with ~100 ml of distilled water at room temperature forming a slurry/solution of the components to which was added sufficient (~12 ml) concentrated $HNO_3$ to convert the $BaCO_3$ to $Ba(NO_3)_2$. The resulting mixture was subjected to intense mixing in a stainless steel food processing blender for 60 seconds and then it was reduced to dryness in air at ~423K in a Teflon beaker.

The dried mixture was heated at a rate of 100K per hour to 1263K where it is held for 2 hours using a covered dense $\alpha$-$Al_2O_3$ crucible. The cooled product was disintegrated in 4 liters distilled water made acid (HCl) to a pH ~5-6.

The resulting product was collected by filtration, washed on the filter and dried. X-ray diffraction analysis showed the product to be phase pure $BaZrO_3$. B.E.T. surface area measurement gave a value of 4.18 meters$^2$ gram$^{-1}$, corresponding to a spherical equivalent average crystal diameter of ~0.23 microns.

EXAMPLE 2

357.95 grams of reagent grade $SrCO_3$ (10% in excess of stoichiometry for $SrZrO_3$) ranging in size up to about 100 microns, 271.60 grams of reagent grade $ZrO_2$ ranging in size up to about 100 microns, 219.70 grams NaCl and 280.3 grams KCl were dry milled for 30 minutes in a 4 liter $\alpha$-$Al_2O_3$ mill. The resulting mixture was then heated in an air atmosphere in covered dense $\alpha$-$Al_2O_3$ crucibles at a rate of 100K per hour to 1273K where it was held for one hour.

The cooled product was disintegrated in 4 liters distilled water made acid (HCl) to pH ~5-6.

The resulting product was collected by filtration, washed on the filter and dried.

X-ray diffraction analysis showed the product to be $SrZrO_3$ with a trace of $Sr_3Zr_2O_7$ (resulting from initial $SrCO_3$ excess). B.E.T. surface area measurements yielded a value of 1.16 meters$^2$ gram$^{-3}$, which corresponds to an average spherical equivalent crystallite diameter of 0.95 micron.

EXAMPLE 3

A powder produced in the same manner as set forth in Examples 1 or 2 can be hot pressed in an alumina die under a pressure of at least about 6000 psi and a temperature of about 1573K to 1673K for about 10 minutes to produce a hot pressed body such as, for example, a disc, having a density higher than 95% of theoretical. Such hot pressured products would be useful as dielectric material for an electrical circuit.

The following copending U.S. patents and applications are assigned to the assignee hereof and are incorporated herein by reference:

U.S. Pat. No. 4,152,281 entitled MOLTEN SALT SYNTHESIS OF LEAD ZIRCONATE TITANATE SOLID SOLUTION POWDER to Arendt et al. discloses that sodium chloride and/or potassium chloride is added to an aqueous suspension of the oxides of lead, titanium and zirconium and stirred until the suspension converts to a gel which is then heated evaporating the water and melting said chloride in which the oxides dissolve and react precipitating lead zirconate titanate.

U.S. Pat. No. 4,152,280 to Arendt et al. entitled MOLTEN SALT SYNTHESIS OF MODIFIED LEAD ZIRCONATE TITANATE SOLID SOLUTION POWDER discloses that sodium chloride and/or potassium chloride is added to an aqueous suspension of the oxides of lead, titanium, zirconium and cationic modifier and stirred until the suspension converts to a gel which is then heated, evaporating the water and melting said chloride in which the oxides dissolve and react precipitating modified lead zirconium titanate.

U.S. Pat. No. 4,201,760 to Arendt et al. entitled MOLTEN SALT SYNTHESIS OF LITHIUM META-ALUMINATE POWDER discloses a process consisting essentially of forming a mixture of an alkali chloride solvent salt, a lithium salt reactant selected from the group consisting of lithium hydroxide, lithium nitrate, lithium carbonate and mixtures thereof, and an aluminum salt reactant selected from the group consisting of aluminum hydroxide, alpha-alumina, gamma-alumina and mixtures thereof and heating said mixture to melt the chloride salt solvent in which the lithium and aluminum salt reactants dissolve and react precipitating lithium meta-aluminate.

Ser. No. 085,921 filed Oct. 18, 1979 for Arendt et al. entitled MOLTEN SALT SYNTHESIS OF ORTHORHOMBIC LEAD METANIOBATE POWDER discloses a process consisting essentially of forming a mixture of lead oxide, niobium pentoxide and an alkali chloride salt solvent and heating said mixture to melt the chloride salt solvent in which the lead oxide and niobium pentoxide dissolve and react precipitating orthorhombic lead metaniobate.

Ser. No. 085,912 filed Oct. 1, 1979 for Arendt et al. entitled MOLTEN SALT SYNTHESIS OF MODI- FIED ALKALI NIOBATE POWDERS discloses a process consisting essentially of forming a mixture of niobium pentoxide, an oxide of sodium, potassium, or mixtures thereof, an oxide of lead, cadmium or mixtures thereof, and an alkali chloride salt solvent, and heating said mixture to melt the chloride salt solvent in which all of the oxides dissolve and react precipitating modified alkali niobate.

Ser. No. 085,911 filed Oct. 18, 1979 for Arendt et al. entitled MOLTEN SALT SYNTHESIS OF ALKALI NIOBATE POWDERS discloses a process consisting essentially of forming a mixture of niobium pentoxide, an oxide of an alkali selected from the group consisting of sodium, potassium, lithium and mixtures thereof, and an alkali chloride salt solvent, and heating said mixture to melt the chloride salt solvent in which the niobium oxide and alkali oxide dissolve and react precipitating the alkali niobate.

Ser. No. 085,924 filed Oct. 18, 1979 for R. H. Arendt entitled MOLTEN SALT SYNTHESIS OF BARIUM AND/OR STRONTIUM TITANATE POWDER discloses a process consisting essentially of forming a mixture of an alkali chloride solvent salt, titanium oxide and an alkaline earth reactant selected from the group consisting of barium oxide, strontium oxide, and mixtures thereof, and heating said mixture to melt the chloride salt solvent in which the titanium oxide and alkaline earth reactant dissolve and react precipitating a titanate selected from the group consisting of barium titanate, strontium titanate and mixtures thereof.

Ser. No. 180,294 filed Aug. 22, 1980 for R. H. Arendt entitled MOLTEN SALT SYNTHESIS OF ALKALINE EARTH TITANATES, ZIRCONATES AND THEIR SOLID SOLUTIONS discloses a process consisting essentially of forming a mixture of an alkali metal hydroxide solvent, a reactant selected from the group consisting of titanium oxide, zirconium oxide and mixtures thereof, and an alkaline earth reactant selected from the group consisting of barium oxide, strontium oxide, and mixtures thereof, and heating said mixture to melt the alkali metal hydroxide solvent in which the reactants dissolve and react precipitating a titanate, zirconate or solid solutions thereof.

What is claimed is:

1. A process for producing an alkaline earth zirconate powder which consists essentially of providing particulate $ZrO_2$ in at least stoichiometric amount or particulate precursor therefor, providing particulate alkaline earth oxide in at least stoichiometric amount of particulate precursor therefor, said alkaline earth oxide being selected from the group consisting of BaO, SrO, and mixtures thereof, providing an alkali chloride salt selected from the group consisting of sodium chloride, potassium chloride and mixtures thereof, forming a mixture of said $ZrO_2$ or precursor therefor, said alkaline earth oxide or precursor therefor and said chloride salt solvent, said chloride salt being used in an amount of at least about 20% by weight of the total amount of said $ZrO_2$, alkaline earth oxide and said chloride salt, heating said mixture to a reaction temperature at least sufficient to melt said chloride salt, each said precursor decomposing completely at or below said reaction temperature to form said oxide and by-product gas, said chloride salt in molten form being a solvent for said $ZrO_2$ and alkaline earth oxide, maintaining said reaction temperature dissolving and reacting said $ZrO_2$ and alkaline earth oxide in said molten salt and precipitating said alkaline earth zirconate, and recovering said precipitated alkaline earth zirconate by dissolving said chloride salt and separating said precipitated alkaline earth zirconate from the resulting salt solution.

2. The process according to claim 1 wherein said alkaline earth oxide is BaO.

3. The process according to claim 1 wherein said alkaline earth oxide is SrO.

4. The process according to claim 1 wherein said alkaline earth oxide is a mixture of BaO and SrO and said alkaline earth zirconate is a solid solution of said alkaline earth components.

5. The process according to claim 1 wherein said alkaline earth oxide is in stoichiometric amount.

6. The process according to claim 1 wherein said $ZrO_2$ and alkaline earth oxide or precursors therefor range in particulate size from submicron up to about 100 microns.

7. The process according to claim 1 wherein said chloride salt is a mixture comprised of 50 mole % sodium chloride and 50 mole % potassium chloride and said reaction temperature is a minimum of about 931K.

* * * * *